(12) United States Patent
Moore

(10) Patent No.: US 6,577,942 B1
(45) Date of Patent: Jun. 10, 2003

(54) DIAGNOSING BRAKE PROBLEMS FROM MINOR WHEEL SLIP VARIATIONS

(75) Inventor: Anthony P. Moore, Portland, OR (US)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 09/696,817

(22) Filed: Oct. 25, 2000

Related U.S. Application Data (60) Provisional application No. 60/161,906, filed on Oct. 27, 1999.

(51) Int. Cl.$^7$ .............................................. B60K 28/10
(52) U.S. Cl. .............................. 701/76; 701/71; 701/74; 180/197
(58) Field of Search ............................ 701/76, 74, 71, 701/82, 90; 180/197; 291/2

(56) References Cited

U.S. PATENT DOCUMENTS

| | | | | |
|---|---|---|---|---|
| 4,991,103 A | * | 2/1991 | Lin | 180/197 |
| 5,173,860 A | * | 12/1992 | Walenty et al. | 303/150 |
| 5,190,361 A | * | 3/1993 | Onaka et al. | 188/181 A |
| 5,281,009 A | * | 1/1994 | Kidston et al. | 303/156 |
| 5,292,187 A | * | 3/1994 | Onaka et al. | 188/181 A |
| 5,308,153 A | * | 5/1994 | Kidston et al. | 303/162 |
| 5,315,518 A | * | 5/1994 | Lin | 303/148 |
| 5,454,630 A | * | 10/1995 | Zhang | 303/175 |
| 5,646,849 A | * | 7/1997 | Walenty et al. | 303/155 |
| 5,662,393 A | * | 9/1997 | Kamiya et al. | 303/191 |
| 5,691,900 A | * | 11/1997 | Luckevich | 701/41 |
| 6,128,567 A | * | 10/2000 | Suzumura | 180/197 |
| 6,202,019 B1 | * | 3/2001 | Schmidt et al. | 180/197 |
| 6,208,928 B1 | * | 3/2001 | Batistic | 303/163 |
| 6,229,438 B1 | * | 5/2001 | Kutlucinar et al. | 340/438 |
| 6,231,134 B1 | * | 5/2001 | Fukasawa et al. | 303/152 |
| 6,289,272 B1 | * | 9/2001 | Batistic et al. | 180/197 |

* cited by examiner

Primary Examiner—William A. Cuchlinski, Jr.
Assistant Examiner—Olga Hernandez
(74) Attorney, Agent, or Firm—Klarquist Sparkman LLC (57) ABSTRACT

Wheel slip is determined for individual wheels of a vehicle. Minor wheel slippage of wheels is evaluated to determine information concerning wheel performance. This information may provide an early indication of wheel problems. Wheel problems or faults may be displayed or otherwise indicated in response to minor wheel slippage conditions.

60 Claims, 5 Drawing Sheets

DIAGNOSING BRAKE PROBLEMS FROM MINOR WHEEL SLIP VARIATIONS

RELATED APPLICATION DATA

This application claims priority to U.S. provisional patent application No. 60/161,906, filed Oct. 27, 1999, entitled, "Diagnosing Brake Problems From Minor Wheel Slip Variations", by Anthony P. Moore, which is hereby incorporated by reference.

BACKGROUND

The present invention relates to monitoring the wheel slip of a plurality of wheels of a vehicle, such as a truck (e.g., a heavy duty or medium duty truck) and/or a heavy duty truck tractor (e.g., a heavy duty or medium duty truck) and trailer combination and determining brake problems and evaluating brake performance from this monitoring.

ABS brake systems are known in which a wheel sensor is provided for each wheel of the vehicle which is to be monitored, typically one wheel speed sensor per vehicle wheel. The ABS brake systems typically compare the speed of each wheel to the vehicle speed and if there is significant slippage (e.g. a wheel speed varies more than 10 to 15 percent from the vehicle speed), the ABS system is operated. That is, if the wheel starts slipping beyond these significant limits, the brake for the slipping wheel or wheels is released.

Minor braking incidences of a vehicle can also produce a small amount of wheel slip. However, known ABS systems ignore minor wheel slip information.

A need exists for an improved brake monitoring system.

SUMMARY

In accordance with the invention, wheel slippage below that which triggers the operation of an ABS system is monitored. In particular, wheel slippage in the range of from about 0.1 percent to 2 percent is monitored. Changes in wheel slippage of a specific wheel at these minor slippage levels over time indicate possible problems with the wheel, such as in the bearings or brakes of the wheel. From changes in wheel slippage information from one braking incident to another for a particular wheel and from comparing wheel slippage of each wheel to that of the other wheels, a determination can be made of the nature of the problem and whether maintenance should be undertaken. Information can be displayed to the driver as well as transmitted remotely for use by a dispatcher in determining the potential significance of the problem. A dispatcher may then determine whether, for example, immediate maintenance should be undertaken or whether maintenance may be delayed until a subsequent scheduled maintenance time. In addition, an alarm indicator may be activated, with selective activation being a possibility, to indicate to a mechanic or a vehicle inspector, for example, that there is a problem with a wheel of the vehicle.

DETAILED DESCRIPTION

Figure 1:
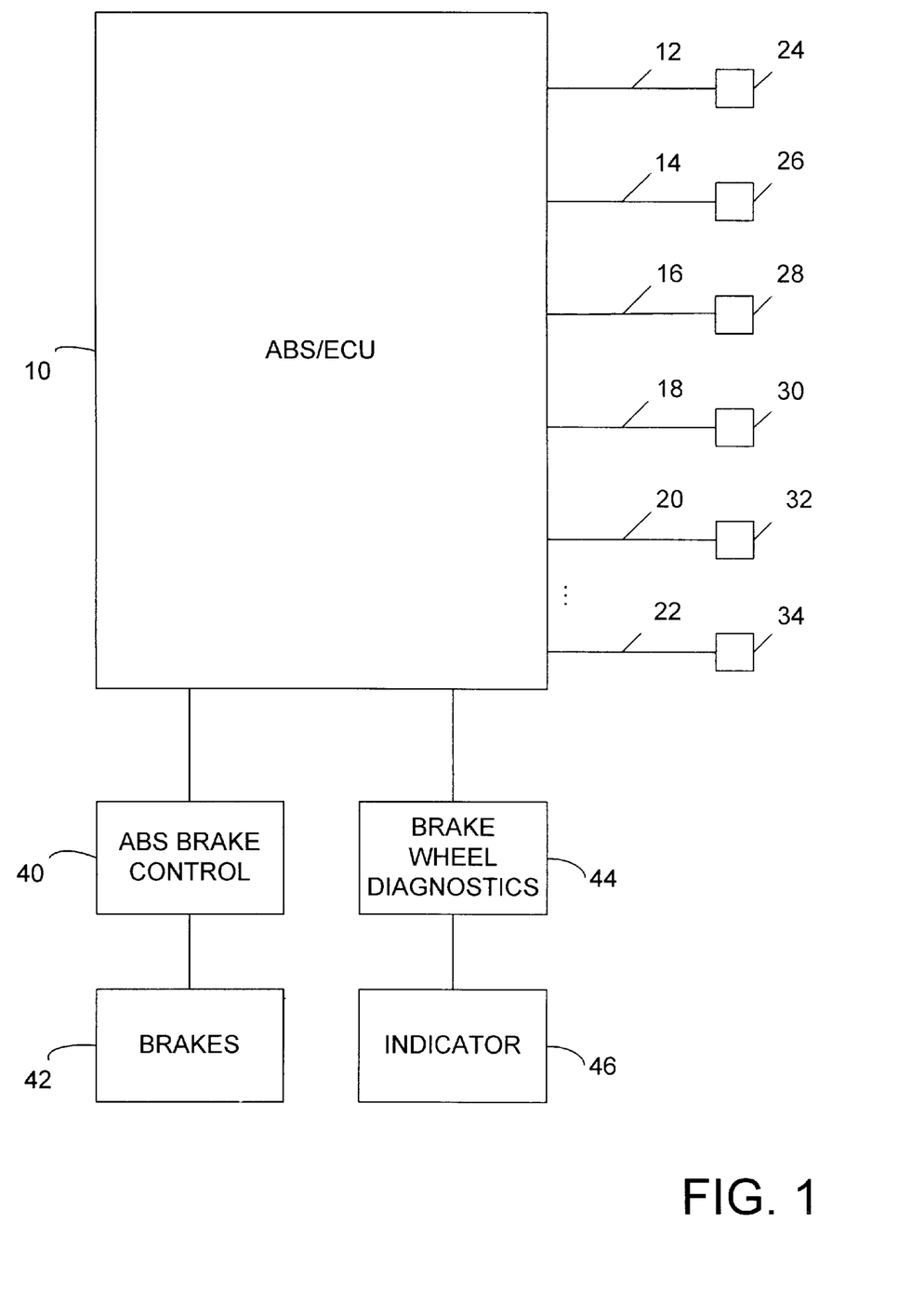
FIG. 1 is a block diagram of a wheel slip monitoring system in accordance with one embodiment of the present invention.

FIG. 1 illustrates in part a standard ABS braking system. With reference to this figure, a system such as a Wabco D ABS system or a Bendix AL7 ABS system, with the invention not being limited to any specific type of ABS system, includes an electronic control unit 10 having a plurality of inputs 12 through 22 each coupled to a respective wheel speed sensor 24–34. Any number of wheels may be monitored although typically there is one wheel speed sensor per wheel although tandem wheels may have only a single wheel speed sensor. In the embodiment of FIG. 1, six wheel sensors are illustrated. The system includes an ABS brake control 40 for controlling the operation of brakes 42. Each wheel typically includes an independently operable brake. In the event significant slippage of one or more wheels is detected relative to the other wheels (e.g. a 10 to 15 percent or more variation in slippage) the ABS brake system is operated. For example, the brake(s) of a wheel(s) which is (are) slipping excessively may be released for a short time.

Figure 2:
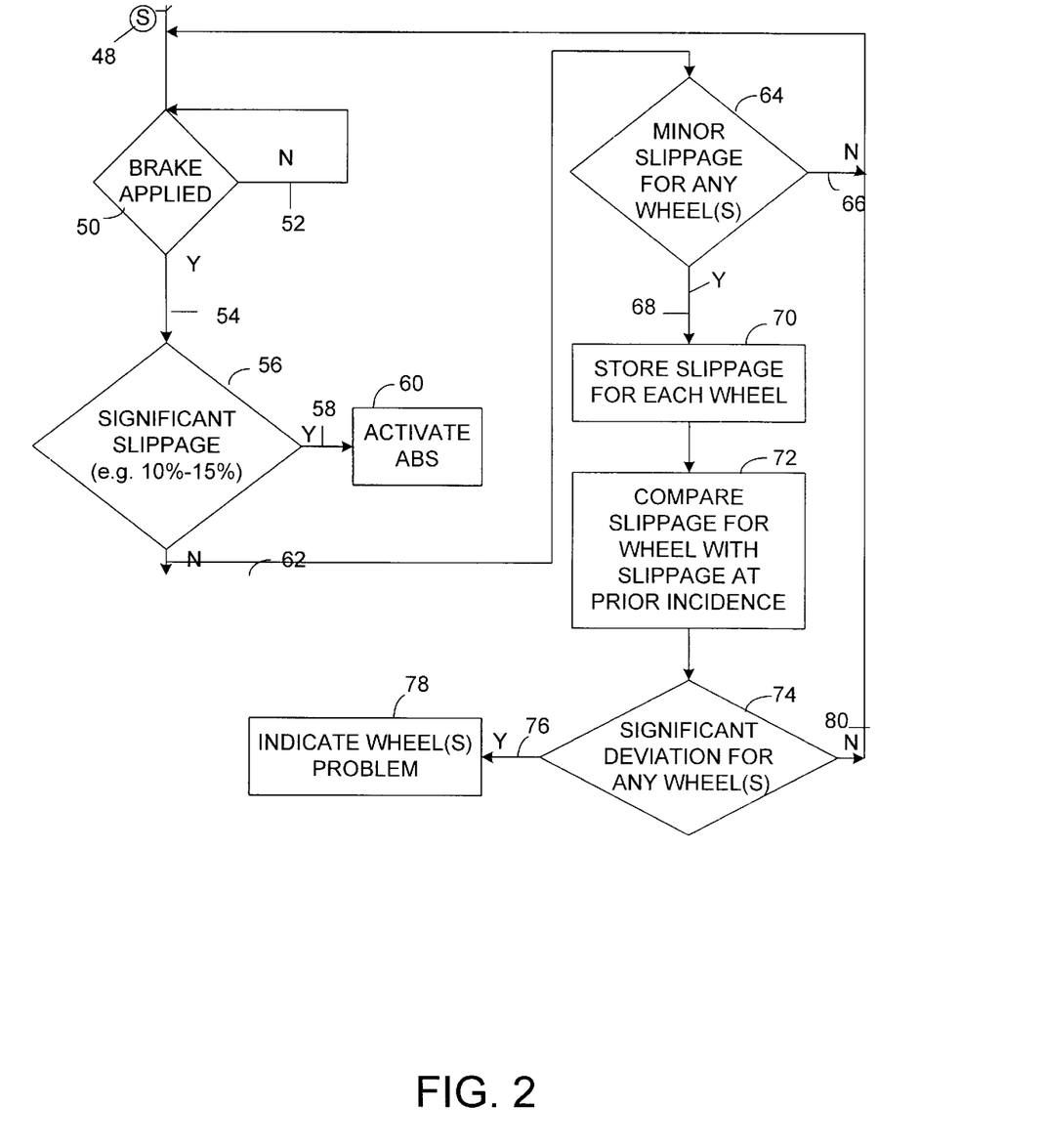
FIG. 2 is a flow chart illustrating one mode of operation of the system of FIG. 1.

FIG. 2, (in part from blocks 48–60), schematically illustrate the operation of a standard ABS system. From start block 48, a brake applied determination block 50 is reached. If the brakes are not being applied, the flow chart loops on branch 52. If the brakes are being applied, a yes branch 54 from block 50 is followed to a determination block 56. At block 56, a determination is made as to whether one or more of the wheels is slipping significantly (e.g. 10 percent to 15 percent or more in excess of the vehicle speed). If the answer is yes, branch 58 is followed to an ABS activation block 60 corresponding to the operation of the ABS brake control block 40 with the brakes for significantly slipping wheels being, for example, released. If no significant slippage is determined at block 56, the no branch 62 from this block is followed to a determination block 64. The process (for determining minor wheel slippage information for each wheel) then continues as described below.

Referring back to FIG. 1, wheel speed signals from the wheel speed sensors are also delivered from ECU 10 to a brake diagnostic subsystem 44. Subsystem 44 may include a computer and memory operable as explained below. The memory, which may take the form of having a computer readable medium, provides storage of data, data structures, computer executable instructions, and the like. The computer readable medium can take the form of, but is not limited to, RAM, DRAM, ROM, PROM, EEPROM, flash memory cards, and magnetic disks. Alternatively, an existing computer system on board the vehicle or the ECU 10 may be programmed to perform this function. The condition of the wheels/brakes may be indicated in a variety of ways as represented schematically by indicator 46. Examples of indication approaches are described below in connection with FIG. 5.

In general, the brake diagnostics system 44 evaluates minor wheel slippage events determined from the wheel speed sensor measurements or ECU 10 information. By minor slippage events, it is meant slippage in the range of from about 0.1 percent to about 2 percent. Each time the brakes are applied in common braking applications which do not trigger the ABS system to operate, typically there is from 1 to 2 percent slippage of one or more wheels relative to the other wheels. Above about 2 percent slippage, the relationships between slippage and wheel characteristics tend to become non-linear and thus the data is not as useful.

At block 64, for a particular braking incident, or for an average of a selected number of such incidents, the existence of minor slippage for any of the wheels being monitored is determined. If no minor slippage is determined, the system follows no branch 66 to the brake applied determination block 50. If minor slippage is determined for any of the wheels, the yes branch 68 from block 64 is followed to a block 70. At block 70, the slippage information is stored for each of the wheels being monitored or for selected wheels only (e.g. the ones that exhibit slippage). From block 70, a block 72 is reached at which a comparison is made between the slippage for a given wheel with slippage stored during a prior braking incident or incidents for the wheel. In addition, the slippage for each wheel may be compared to that of the other wheels. At block 74, a determination is made as to whether there has been a significant deviation in slippage for any of the wheels between braking incidences. If the answer is yes, the yes branch 76 is followed to a block 78. At block 78, an indication is made of the possibility of a wheel or brake problem for a particular wheel or wheels as determined from the minor slippage deviation for such wheel or wheels. If no significant deviation is determined at block 74, a no branch 80 is followed from block 74 back to the brake application determination block 50.

Figure 3:
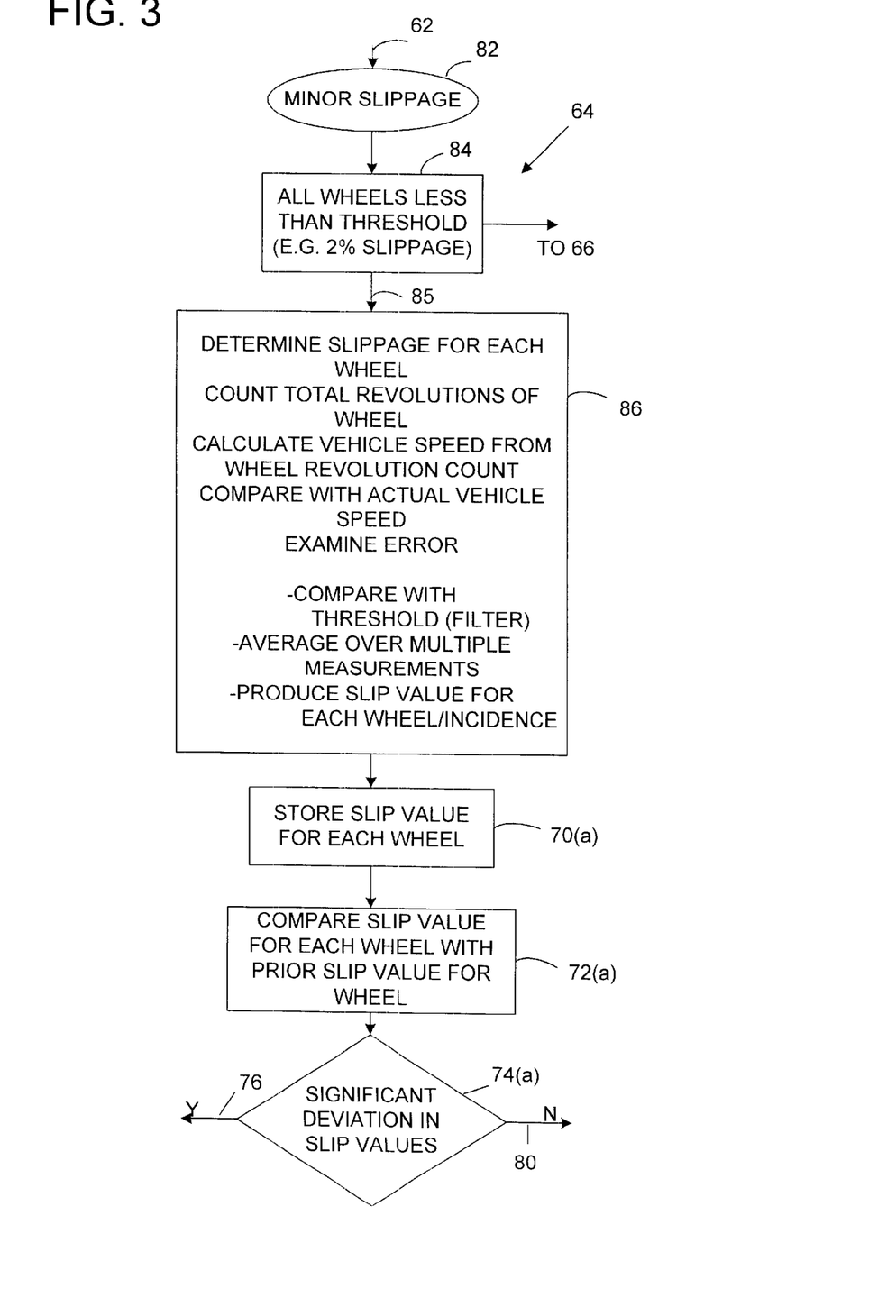
FIG. 3 illustrates an approach for determining minor slippage associated with the wheels being monitored.

FIG. 3 illustrates one approach for evaluating whether minor slippage has occurred.

From a start block 82, a determination is made at block 84 whether all of the wheels being monitored for slippage have a slippage which is less than a threshold (for example, less than a predetermined threshold such as less than 2 percent slippage). If yes, yes branch 85 is followed to a determination block 86. Alternatively, the yes branch 85 may be followed to the determination block 86 if the slippage for only one wheel exceeds the predetermined threshold while the slippage for the remaining wheels is below the threshold. In this case, the slippage for all wheels may be evaluated. Alternatively, the wheels with minor slippage (e.g. 2 percent slippage or less) may be evaluated with, for example, the wheel with greater slippage not being evaluated. If only one wheel has major slippage and all of the other wheels have minor slippage, this may indicate something is wrong with the brake for the one wheel exhibiting major slippage. For example, that the brake for this wheel has grabbed the brake drum. This may be indicated or displayed, such as in the same manner as other brake faults as explained below. In this embodiment, if major slippage of multiple wheels is detected, the process returns to line 66 as detection of more than minor slippage is occurring. If two or more wheels exhibit major slippage, one could still continue the process at block 86 of evaluating wheel slippage of individual wheels. However, in this case, it becomes more difficult to separate brake faults from proper ABS system operation, making this option less desirable.

At block 86, the slippage for each wheel is desirably determined. As one specific approach, the total revolutions of each wheel may be counted and used to calculate the wheel speed of each wheel. For example, from the revolution count of each wheel, the angular velocity of each wheel may be determined. The wheel speed of each wheel relative to the road surface may be calculated by multiplying the angular velocity by the radius of the tire. The tires may be assigned a radius value. Alternatively, the radius value may be measured or assigned based upon specific tire characteristics, such as the type of tire. The radius value may be adjusted over time, such as based on assumed tire wear as a result of mileage on the tire. A comparison can then be made with the actual vehicle speed which may be determined from information available concerning vehicle speed on a conventional data bus included in the vehicle. The deviation or error between the calculated wheel speed and the actual vehicle speed is then determined for each wheel. This error or deviation may be compared with a threshold, which may be a predetermined minimum threshold, with differences below the threshold being filtered out. For example, the threshold may be set at 0.25 percent slippage or more desirably at a lower threshold such as at about 0.1 percent. This may be varied, for example, some systems generate greater noise which would be addressed by establishing the threshold at a higher level. The slippage for individual wheels may be averaged over multiple measurements, for example, over 2 to 10 measurements, to minimize the impact of aberrations in the sensed wheel speed. A slip value for each wheel having minor slippage may then be generated for each braking incident. Alternatively, average slip values may be determined for several braking incidents.

In an alternative embodiment, blocks 82 and 84 may be combined so that the slippage for each wheel is calculated prior to the determination of whether all of the wheels being monitored have a slippage which is less than the predetermined threshold.

Figure 4:
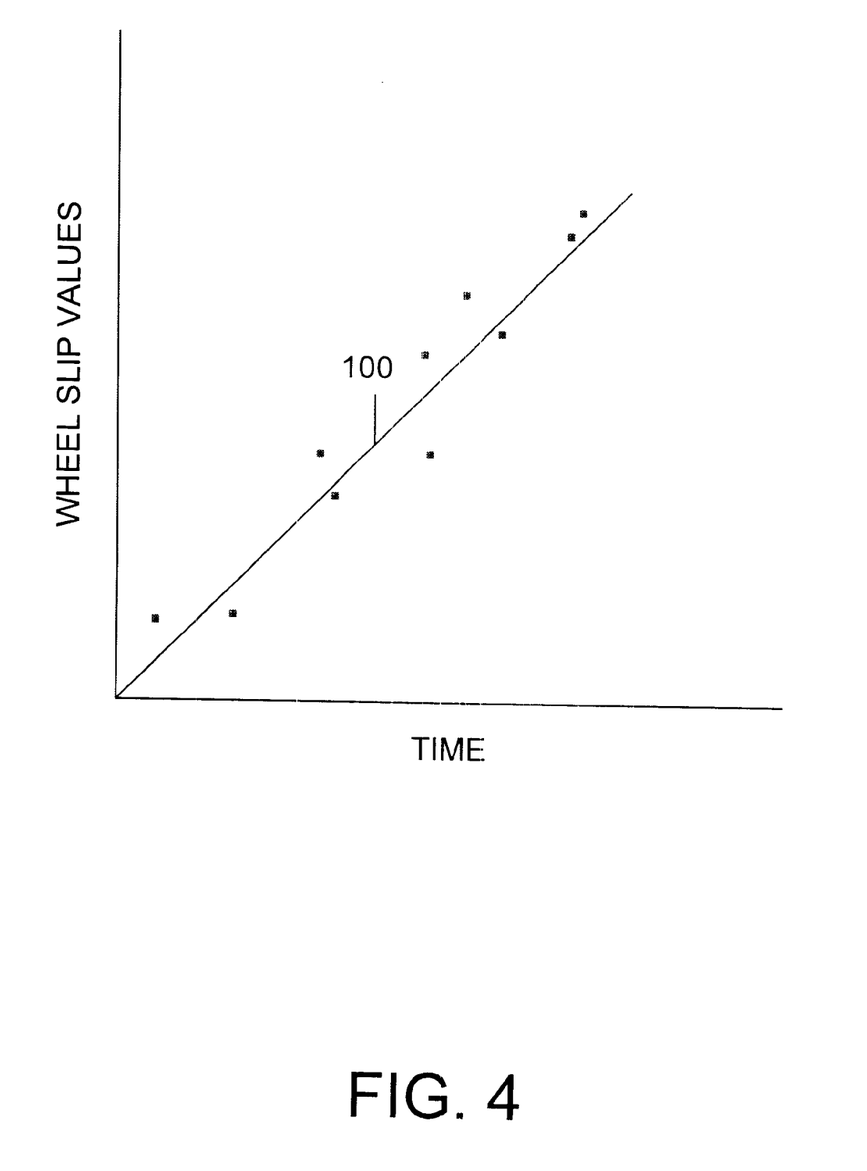
FIG. 4 illustrates one approach for evaluating changes in wheel slippage for a particular wheel over time.

At block 70A, the minor slip values are stored for each wheel. At block 72A, the slip value for each wheel is compared with prior slip values for each wheel. As a result of these comparisons, the trend in slip values may be determined. As shown in FIG. 4, as one specific example, the wheel slip values for each wheel may be plotted against time and a best fit curve or line 100 determined for the plotted values. The slope of the line indicates how wheel slip values are changing over time. The magnitude of the slope can be used in determining, at block 74A, whether a significant deviation in slip values is occurring. Alternatively, the slip values for a wheel from different braking events may be compared directly to determine differences in the values. Also, slip values may be averaged with the averages being compared to determine whether significant deviations have occurred. The invention is not limited to any specific way of comparing the slip values.

The rate of change in slip values provides an indication of the nature of the problem occurring at a wheel. If a wheel slips more over time, this can indicate a change between the brake lining and the drum (e.g. the presence of debris between the brake lining and drum or that the brake pads have worn so that rivets in the brake pads are now engaging the brake drum). Less slippage can indicate worn brakes, oil on the brakes (e.g. due to leaking hydraulic cylinders) or that the brake drum is cracked. The rate of change also provides an indication of how rapidly repair of the vehicle should be made. An extremely rapid change may indicate, for example, that the wheel should be repaired or checked promptly.

Figure 5:
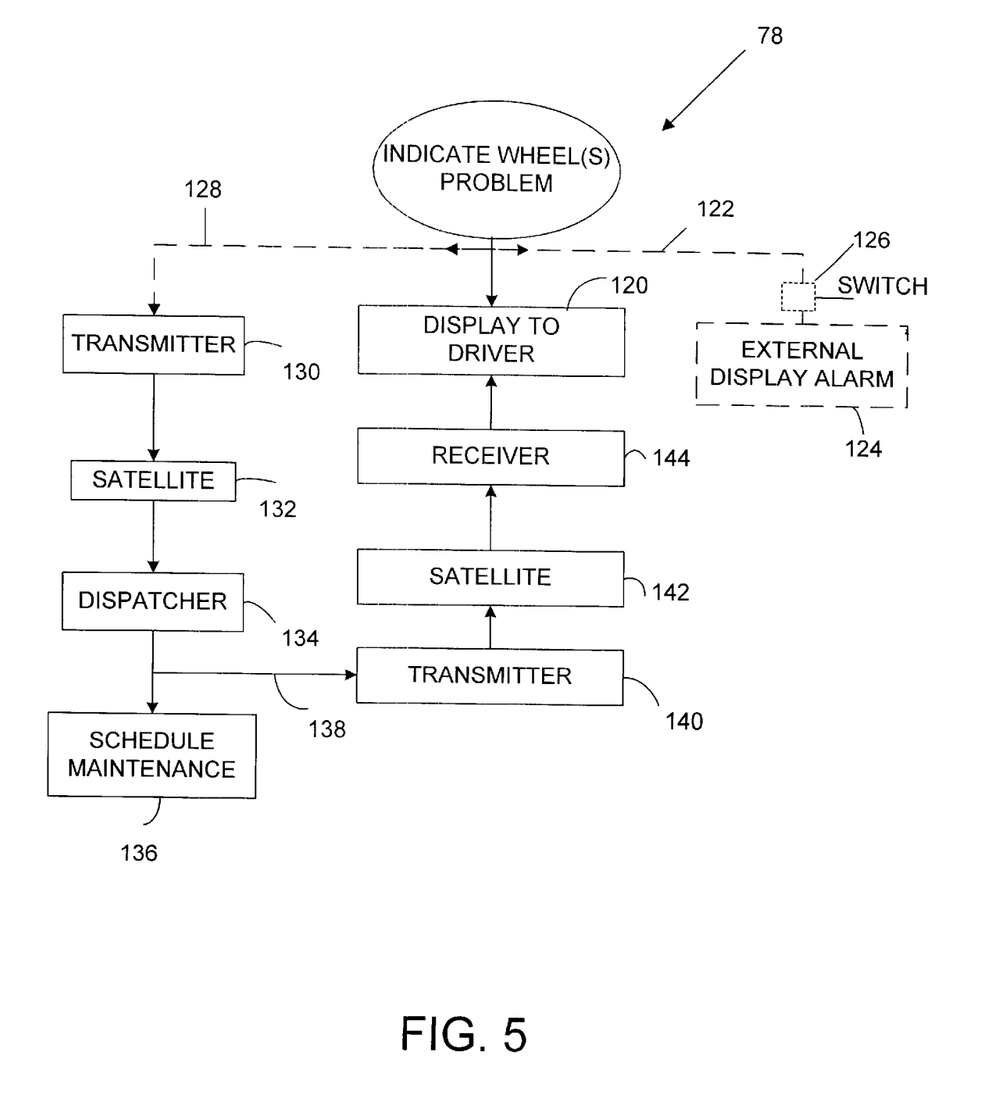
FIG. 5 illustrates one form of indication approach and system for use in the wheel slip monitoring system of FIG. 1.

FIG. 5 illustrates alternatives for indicating the state of a particular wheel.

For example, if a particular wheel exhibits slippage deviations corresponding to a potential problem with the wheel, a signal may be sent to a display 120 which indicates to the driver that a problem exists with the wheel. The display may indicate the particular wheel and may indicate the nature of the problem and whether the wheel should be immediately checked. As an option, an external display or alarm, such as a light 124, may be coupled by line 122 to the system with the light or alarm being activated in the event a significant wheel problem is indicated. An optional switch 126 may be included in line 122. Switch 126 may be activated, such as selectively activated by a mechanic or a vehicle inspector as the vehicle travels through or is at a vehicle weigh station or other checkpoint. The switch may be remotely activated. If the switch is activated and the alarm or light then operates, the vehicle inspector or mechanic is alerted to the possible problem with a wheel on the vehicle and may require the vehicle to be repaired before continuing.

As another option, information concerning wheel slippage may be sent along a line 128 to a transmitter 130 and then, for example, via satellite 132 to a receiver at the location of a vehicle dispatcher 134. From the wheel slippage signals, the dispatcher may then evaluate whether maintenance should occur immediately or at some other time. The dispatcher may then schedule the maintenance as indicated by block 136. In addition, a signal may be sent by the dispatcher via line 138 to a transmitter 140 and via a satellite 142 (which may be the same satellite 132) to a receiver 144 which may be on board the truck or at a vehicle repair location. A signal may then be displayed to the driver or repair person, such as at the display 120 or at a remote display. The driver may be informed by the dispatcher to pull the vehicle off the road immediately until such a time as the vehicle may be towed to a repair facility or repaired on site. Alternatively, the signal may indicate to the driver to have a particular wheel checked at a specified maintenance facility or during the next regularly scheduled maintenance of the vehicle.

By detecting wheel problems and brake problems at an early time before a truck breaks down, the problems may be fixed at a more convenient time rather than having to repair a truck which has broken down on the highway.

The invention is not limited to the specific embodiment described above. The invention includes all novel and non-obvious features set forth above, as well as equivalents to such features, both alone and in combination with one another.

I claim:

1. A method of monitoring wheel slip values of a vehicle having an anti-lock braking system and a plurality of wheels, the method comprising:
    generating slip values for at least one wheel of the vehicle;
    a plurality of slip values which are less than a slip value required to activate the anti-lock braking system; and
    evaluating a plurality of the slip values which are less than a slip value required to activate the anti-lock braking system to determine whether a problem exists in the brakes of the at least one wheel.

2. A method of monitoring wheel slip values of a vehicle having an anti-lock braking system and a plurality of wheels, the method comprising:
    generating a plurality of slip values for at least one wheel of the vehicle;
    a plurality of slip values which are less than a slip value required to activate the anti-lock braking system; and
    comparing at least one stored slip value for the at least one wheel with at least one previously stored slip value for the at least one wheel so as to determine whether a problem exists in the brakes at the at least one wheel.

3. The method of claim 1 wherein the generated slip values correspond to the deviation between the wheel speed and the vehicle speed.

4. A method of monitoring wheel slip values of a vehicle having an anti-lock braking system and a plurality of wheels, the method comprising:
    generating a plurality of slip values for at least one wheel of the vehicle;
    a plurality of slip values which are less than a slip value required to activate the anti-lock braking system; and
    wherein the generated slip values correspond to the average deviation between the wheel speed and the vehicle speed for a plurality of braking incidents.

5. The method of claim 2 in which the comparing act comprises comparing slip values which are less than a first threshold.

6. A method of monitoring wheel slip values of a vehicle having an anti-lock braking system and a plurality of wheels, the method comprising:
    generating a plurality of slip values for at least one wheel of the vehicle;
    a plurality of slip values which are less than a slip value required to activate the anti-lock braking system; and
    comparing at least one stored slip value for the at least one wheel with at least one previously stored slip value for the at least one wheel so as to determine whether a possible problem exists in the brakes at the at least one wheel;
    in which the comparing act comprises comparing slip values which are less than a first threshold; and
    wherein the first threshold is about 2 percent.

7. The method of claim 5 in which the comparing act comprises comparing slip values which are in excess of a second threshold.

8. A method of monitoring wheel slip values of a vehicle having an anti-lock braking system and a plurality of wheels, the method comprising:
    generating a plurality of slip values for at least one wheel of the vehicle;
    a plurality of slip values which are less than a slip value required to activate the anti-lock braking system; and
    comparing at least one stored slip value for the at least one wheel with at least one previously stored slip value for the at least one wheel so as to determine whether a possible problem exists in the brakes at the at least one wheel;
    in which the comparing act comprises comparing slip values which are less than a first threshold;
    in which the comparing act comprises comparing slip values which are in excess of a second threshold; and
    wherein the second threshold is about 0.1 percent.

9. A method of monitoring wheel slip values of a vehicle having an anti-lock braking system and a plurality of wheels, the method comprising:
    generating a plurality of slip values for at least one wheel of the vehicle;
    a plurality of slip values which are less than a slip value required to activate the anti-lock braking system;
    comparing at least one stored slip value for the at least one wheel with at least one previously stored slip value for the at least one wheel so as to determine whether a possible problem exists at the wheel; and
    wherein the act of comparing comprises calculating the rate of change of the compared slip values.

10. A method of monitoring wheel slip values of a vehicle having an anti-lock braking system and a plurality of wheels, the method comprising:
    generating a plurality of slip values for at least one wheel of the vehicle;
    a plurality of slip values which are less than a slip value required to activate the anti-lock braking system;
    comparing at least one stored slip value for the at least one wheel with at least one previously stored slip value for the at least one wheel so as to determine whether a possible problem exists at the wheel; and wherein the act of comparing comprises calculating the difference between the at least one stored slip value and the at least one other stored slip value, the compared slip values being generated from separate braking incidents of the at least one wheel.

11. A method of monitoring wheel slip values of a vehicle having an anti-lock braking system and a plurality of wheels, the method comprising:

generating a plurality of slip values for at least one wheel of the vehicle;

a plurality of slip values which are less than a slip value required to activate the anti-lock braking system;

comparing at least one stored slip value for the at least one wheel with at least one previously stored slip value for the at least one wheel so as to determine whether a possible problem exists at the wheel; and further comprising the act of alerting the vehicle operator in the event a possible problem is determined to exist at the at least one wheel as a result of the comparing act.

12. A method of monitoring wheel slip values of a vehicle having an anti-lock braking system and a plurality of wheels, the method comprising:

generating a plurality of slip values for at least one wheel of the vehicle;

a plurality of slip values which are less than a slip value required to activate the anti-lock braking system;

comparing at least one stored slip value for the at least one wheel with at least one previously stored slip value for the at least one wheel so as to determine whether a possible problem exists at the wheel; and further comprising the act of transmitting the stored slip values to a site which is remote from the vehicle for remote monitoring of the performance of the at least one wheel.

13. The method of claim 12 further comprising the act of indicating at the remote site the existence of a possible problem at the at least one wheel.

14. The method of claim 13 further comprising the act of sending a signal from the remote site to the vehicle relating to the possible problem.

15. A method of monitoring wheel slip values having an anti-lock braking system and a plurality of wheels, the method comprising:

determining slip values for at least one wheel of the vehicle at a plurality of times; and comparing a plurality of slip values for the at least one wheel with one another and which compared slip values are less than the slip value required to activate the anti-lock braking system so as to determine whether a possible problem exists at the wheel.

16. The method of claim 15 including the act of indicating whether a possible problem exists at the at least one wheel in response to the comparison.

17. The method of claim 16 in which the indicating act comprises indicating that a possible problem exists to an individual who is outside of the vehicle.

18. The method of claim 17 in which the individual is a vehicle inspector at a weigh station or other roadside location.

19. The method of claim 17 in which the individual is at a location which is remote from the vehicle.

20. A method of monitoring wheel slip values having an anti-lock braking system and a plurality of wheels, the method comprising:

determining slip values for at least one wheel of the vehicle at a plurality of times; and comparing slip values for the at least one wheel which are less than the slip value required to activate the anti-lock braking system so as to determine whether a possible problem exists at the wheel; and in which the determining act comprises determining slip values for a plurality of wheels and the comparing act comprises comparing slip values determined at times when no more than one wheel is determined to have a slip value in excess of the value required to activate the anti-lock brake system.

21. The method of claim 20 including the act of indicating the one wheel if it is the only one with a slip value in excess of the value required to activate the anti-lock braking system.

22. A method of monitoring wheel slip values having an anti-lock braking system and a plurality of wheels, the method comprising:

determining slip values for at least one wheel of the vehicle at a plurality of times; and comparing slip values for the at least one wheel which are less than the slip value required to activate the anti-lock braking system so as to determine whether a problem exists at the wheel; and wherein slip values for the at least one wheel which are less than about 2 percent are compared in the comparing act.

23. A method of monitoring wheel slip values of a vehicle having an anti-lock braking system and a plurality of wheels, the method comprising:

determining slip values for at least one wheel of the vehicle at a plurality of times;

comparing slip values for the at least one wheel which are less than the slip value required to activate the anti-lock braking system so as to determine whether a possible problem exists at the wheel; and wherein slip values for the at least one wheel which are between about 0.1 percent and about 2 percent are compared in the comparing act.

24. A method of monitoring wheel slip values having an anti-lock braking system and a plurality of wheels, the method comprising:

determining slip values for at least one wheel of the vehicle at a plurality of times; and comparing slip values for the at least one wheel which are less than the slip value required to activate the anti-lock braking system so as to determine whether a problem exists at the wheel; and wherein slip values between first and second predetermined thresholds is compared.

25. A method for monitoring wheel slip values comprising:

determining a plurality of slip values for at least one wheel;

comparing plural slip values for the at least one wheel with one another, the compared slip values being in the range of from about 0.1 to about 2 percent from at least selective determinations; and indicating the existence of possible wheel brake problems determined from the compared slip values.

26. A method according to claim 25 in which the indicating act comprises the act of indicating possible wheel brake problems only if slip values determined at a given time for all but one wheel are in the range of from about 0.1 to about 2 percent.

27. A system for monitoring minor wheel slip values in a vehicle having an anti-lock braking system and a plurality of wheels, the system comprising:
   a sensor for measuring the wheel speed of at least one wheel of the vehicle;
   a computer linked to the sensor and operable to generate slip values for the at least one wheel of the vehicle and store at least certain slip values which are less than a first value, the first value being less than the slip value required to activate the anti-lock braking system; and
   wherein the computer is operable to compare at least one stored slip values for the at least one wheel with at least one other stored slip value for the at least one wheel to determine whether a possible problem exists at the brakes of the at least one wheel.

28. A system for monitoring minor wheel slip values in a vehicle having an anti-lock braking system and a plurality of wheels, the system comprising:
   a sensor for measuring the wheel speed of at least one wheel of the vehicle;
   a computer linked to the sensor and operable to generate slip values for the at least one wheel of the vehicle and store at least certain slip values which are less than a first value, the first value being less than the slip value required to activate the anti-lock braking system;
   wherein the computer is operable to compare stored slip values for the at least one wheel to determine whether a possible problem exists at the at least one wheel; and
   further comprising an indicator responsive to the computer for alerting the vehicle operator if a possible problem exists at the wheel.

29. A system of for monitoring minor wheel slip values in a vehicle having an anti-lock braking system and a plurality of wheels, the system comprising:
   a sensor for measuring the wheel speed of at least one wheel of the vehicle;
   a computer linked to the sensor and operable to generate slip values for the at least one wheel of the vehicle and store at least certain slip values which are less than a first value, the first value being less than the slip value required to activate the anti-lock braking system;
   wherein the computer is operable to compare stored slip values for the at least one wheel to determine whether a possible problem exists at the at least one wheel; and
   further comprising a remote indicator selectively linked to the computer for remote monitoring of slip values.

30. The system of claim 27 wherein the computer is the electronic control unit of the anti-lock braking system.

31. The system of claim 27 wherein the computer is operable to compare slip values by calculating the rate of change of slip values for the at least one wheel.

32. A system for monitoring minor wheel slip values in a vehicle having an anti-lock braking system and a plurality of wheels, the system comprising:
   a sensor for measuring the wheel speed of at least one wheel of the vehicle;
   a computer linked to the sensor and operable to generate slip values for the at least one wheel of the vehicle and store at least certain slip values which are less than a first value, the first value being less than the slip value required to activate the anti-lock braking system; and
   wherein the computer is operable to compare the slip values by calculating the difference in slip values for the at least one wheel generated during different braking events.

33. The system of claim 32, wherein the first value is about 2 percent.

34. A system for monitoring minor wheel slip values in a vehicle having an anti-lock braking system and a plurality of wheels, the system comprising:
   a sensor for measuring the wheel speed of at least one wheel of the vehicle;
   a computer linked to the sensor and operable to generate slip values for the at least one wheel of the vehicle and store at least certain slip values which are less than a first value, the first value being less than the slip value required to activate the anti-lock braking system;
   wherein the computer is operable to compare stored slip values for the at least one wheel to determine whether a possible problem exists at the at least one wheel; and
   wherein the computer is operable to compare slip values and to determine possible wheel problems from slip values that are in the range of from about 0.10 percent to 2 percent.

35. The system of claim 27 wherein slip values are generated for all wheels of the vehicle.

36. A method of monitoring minor wheel slip variations in a vehicle, the method comprising:
   generating plural slip values for at least one wheel of the vehicle;
   storing at least certain generated slip values if less than about 2 percent;
   comparing at least a first stored slip value for the at least one wheel with at least a second a stored slip value for the at least one wheel to determine whether a possible problem exists at the at least one wheel; and
   indicating the existence of a possible problem at the at least one wheel in response to the comparison.

37. A method for diagnosing brake problems in a vehicle having an anti-lock braking system, the method comprising:
   for each wheel being monitored, calculating wheel slip values as a result of braking incidents;
   activating an anti-lock braking system to control the braking force to any of said each wheel being monitored whose slip value exceeds a first value; and
   for each wheel being monitored, comparing at least certain slip values which are of a second value which is less than the first value to determine whether a brake problem exists at any of the said each wheel being monitored.

38. The method of claim 37 further comprising the act of indicating the existence of a possible brake problem at a wheel.

39. The method of claim 37 in which the comparing act comprises comparing at least certain slip values which are of a second value which are greater than a third value.

40. The method of claim 39 in which the second and third values are respectively about 2 percent and about 0.1 percent.

41. The method according to claim 39 in which the second and third values are predetermined.

42. A method of monitoring wheel slip values of a vehicle having an anti-lock braking system and a plurality of wheels, the method comprising:
   generating slip values for at least one wheel of the vehicle;
   a plurality of slip values which are less than a slip value required to activate the anti-lock braking system;
   evaluating a plurality of the slip values which are less than a slip value required to activate the anti-lock braking system to determine whether a possible problem exists in the brakes of the at least one wheel; and further comprising the act of indicating to a site which is remote from the vehicle the existence of a possible problem in the brakes at the at least one wheel determined from the evaluation of the plurality of slip values.

43. The method of claim 42 further comprising the act of sending a signal from the remote site to the vehicle relating to the possible brake problem.

44. A method of monitoring wheel slip values of a vehicle having an anti-lock braking system and a plurality of wheels, the method comprising:

generating a plurality of slip values for at least one wheel of the vehicle;

a plurality of slip values which are less than a slip value required to activate the anti-lock braking system;

comparing at least one stored slip value for the at least one wheel with at least one previously stored slip value for the at least one wheel so as to determine whether a possible problem exists in the brakes at the at least one wheel; and further comprising the act of comparing at least one stored slip value for the at least one wheel with at least one previously stored slip value for the at least one wheel so as to determine whether a problem exists in the brakes at the at least one wheel, and transmitting the stored slip values to a site which is remote from the vehicle for remote monitoring of the performance of the brakes of the at least one wheel.

45. A method of monitoring wheel slip values of a vehicle having an anti-lock braking system and a plurality of wheels, the method comprising:

generating a plurality of slip values for at least one wheel of the vehicle;

a plurality of slip values which are less than a slip value required to activate the anti-lock braking system;

comparing at least one stored slip value for the at least one wheel with at least one previously stored slip value for the at least one wheel so as to determine whether a possible problem exists in the brakes at the at least one wheel;

comprising the act of comparing at least one stored slip value for the at least one wheel with at least one previously stored slip value for the at least one wheel so as to determine whether a problem exists in the brakes at the at least one wheel, and transmitting the stored slip values to a site which is remote from the vehicle for remote monitoring of the performance of the brakes of the at least one wheel; and further comprising the act of indicating at the remote site the existence of a possible problem in the brakes at the at least one wheel.

46. The method of claim 45 further comprising the act of sending a signal from the remote site to the vehicle relating to the possible problem in the brakes of the at least one wheel.

47. The method of claim 1 comprising the act of generating a plurality of slip values for each wheel of the vehicle having an anti-lock braking system and wherein the act of evaluating comprises determining whether a possible problem exists in the brakes of any of said each wheel.

48. A method of monitoring wheel slip values having an anti-lock braking system and a plurality of wheels, the method comprising:

determining slip values for at least one wheel of the vehicle at a plurality of times; and comparing at least one first slip value for the at least one wheel with at least one second slip value for the at least one wheel, the compared slip values being less than the slip value required to activate the anti-lock braking system so as to determine whether a possible problem exists in the brakes at the at least one wheel.

49. A method of monitoring wheel slip values having an anti-lock braking system and a plurality of wheels, the method comprising:

determining slip values for at least one wheel of the vehicle at a plurality of times;

comparing slip values for the at least one wheel which are less than the slip value required to activate the anti-lock braking system so as to determine whether a possible problem exists in the brakes at the wheel; and including the act of indicating that a possible problem exists in the brakes at the at least one wheel in response to the comparison.

50. The method of claim 49 in which the indicating act comprises indicating that a possible problem exists in the brakes to an individual who is outside of the vehicle.

51. The method of claim 50 in which the individual is a vehicle inspector at a weigh station or other roadside location.

52. The method of claim 50 in which the individual is at a location which is remote from the vehicle.

53. The method of claim 48 in which the determining act comprises determining first and second slip values for a plurality of wheels and the comparing act comprises comparing at least one first slip value with at least one second slip value for each respective wheel of the plurality of wheels, and wherein the comparing act comprises comparing first and second slip values determined at times when no more than one wheel is determined to have a slip value in excess of the value required to activate the anti-lock brake system.

54. A method of monitoring wheel slip values having an anti-lock braking system and a plurality of wheels, the method comprising:

determining slip values for at least one wheel of the vehicle at a plurality of times; and comparing slip values for the at least one wheel which are less than the slip value required to activate the anti-lock braking system so as to determine whether a possible problem exists in the brakes at the wheel;

in which the determining act comprises determining slip values for a plurality of wheels and the comparing act comprises comparing slip values determined at times when no more than one wheel is determined to have a slip value in excess of the value required to activate the anti-lock brake system; and including the act of indicating the one wheel if it is the only one with a slip value in excess of the value required to activate the anti-lock braking system.

55. The method of claim 48 wherein first and second slip values for the at least one wheel which are less than about 2 percent are compared in the comparing act.

56. The method of claim 48 wherein first and second slip values for the at least one wheel which are between about 0.1 percent and about 2 percent are compared in the comparing act.

57. A method of monitoring wheel slip values having an anti-lock braking system and a plurality of wheels, the method comprising:

determining slip values for at least one wheel of the vehicle at a plurality of times; and comparing slip values for the at least one wheel which are less than the slip value required to activate the anti-lock braking system so as to determine whether a possible problem exists in the brakes at the wheel; and wherein slip values for the at least one wheel between first and second predetermined thresholds are compared.

58. A method of monitoring wheel slip values having an anti-lock braking system and a plurality of wheels, the method comprising:

determining slip values for at least one wheel of the vehicle at a plurality of times; and comparing slip values for the at least one wheel which are less than the slip value required to activate the anti-lock braking system so as to determine whether a possible problem exists in the brakes at the wheel; and wherein slip values are determined for each wheel of the vehicle having an anti-lock brake and the slip values for each wheel are compared with other slip values for the same wheel so as to determine whether a possible problem exists in the brakes of each wheel.

59. The system of claim 28 wherein the indicator is responsive to the computer for alerting the vehicle operator if a possible problem exists in the brakes at the wheel.

60. The system of claim 29 wherein the remote indicator remotely indicates the presence of possible brake problems at the at least one wheel.

* * * * *